No. 761,460.  PATENTED MAY 31, 1904.
J. G. EBKEN.
VEHICLE BRAKE.
APPLICATION FILED OCT. 17, 1903.
NO MODEL.
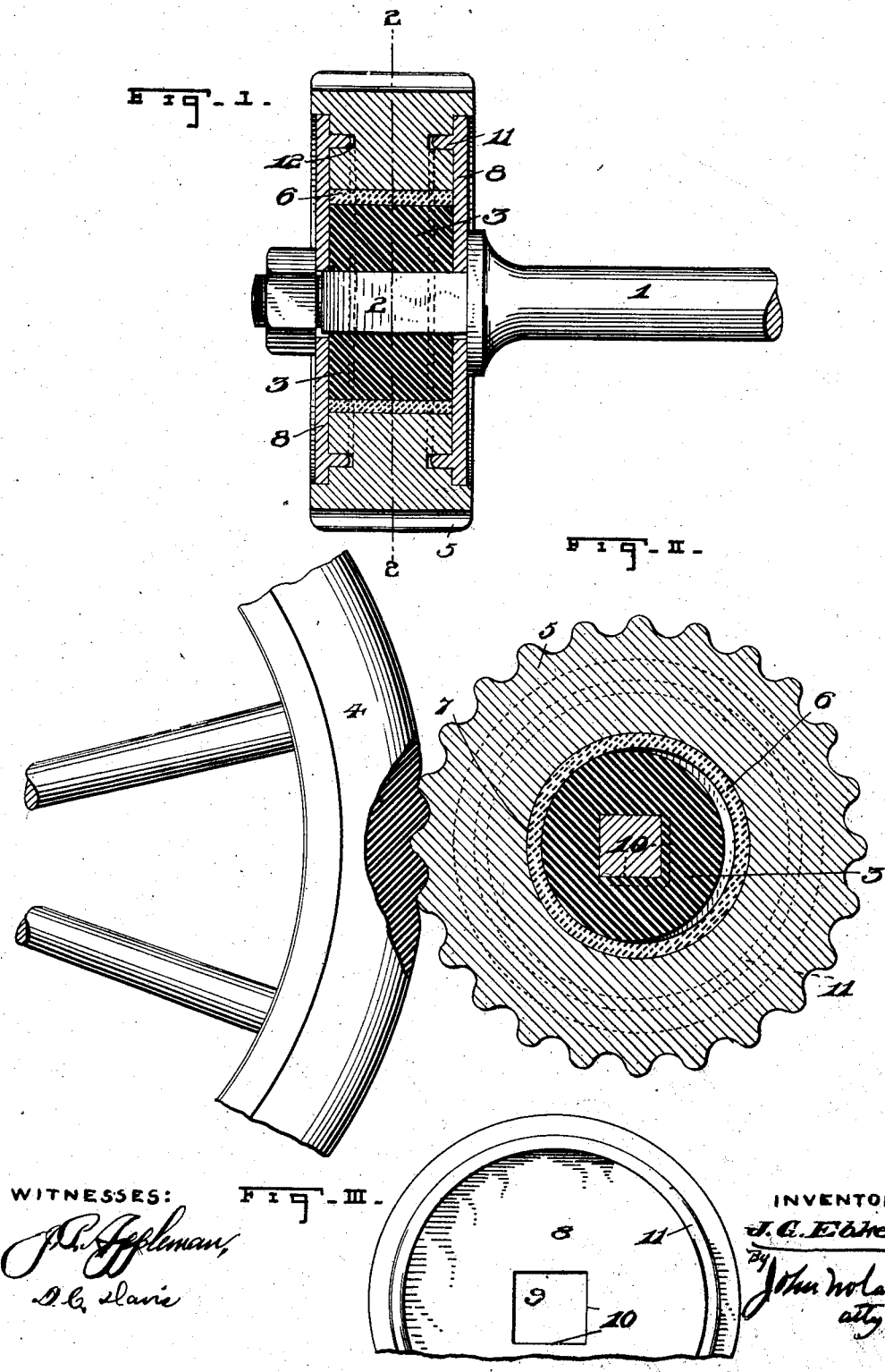

No. 761,460.  
Patented May 31, 1904.

UNITED STATES PATENT OFFICE.

JOHN G. EBKEN, OF PITTSBURG, PENNSYLVANIA.

VEHICLE-BRAKE.

SPECIFICATION forming part of Letters Patent No. 761,460, dated May 31, 1904.

Application filed October 17, 1903. Serial No. 177,403. (No model.)

*To all whom it may concern:*

Be it known that I, JOHN G. EBKEN, a citizen of the United States of America, residing at Pittsburg, in the county of Allegheny and State of Pennsylvania, have invented certain new and useful Improvements in Vehicle-Brakes, of which the following is a specification.

My invention relates to an improvement in rotary brakes for carriages, wagons, automobiles, and the like; and it consists in having new and novel features not used heretofore, as is shown in the drawings and described in the specification.

In the accompanying drawings, illustrating my invention, Figure 1 is a vertical section view of my improved brake. Fig. 2 is a sectional view taken on the line 2 2 of Fig. 1. Fig. 3 is a view, partly broken away, showing one of the dust-proof washers.

The object of my invention is to construct a wheel-brake for rubber tires and one that will not destroy the tire when brought into engagement with the brake. The flat shoe-brakes now in use for such tires are very destructive to the surface of the tires, as it comes into contact too quick, thereby cutting into the rubber and mutilating the tread of the tire, whereas with my brake the pressure is exerted gradually and also allows the brake-wheel to revolve, as by this feature the gum is not chipped off, as is the case in the flat brake-shoe.

Referring to the accompanying drawings, 1 is a brake-beam and having formed integral therewith a square shaft 2, that fits into a corresponding opening formed in the body of rubber 3.

The rubber or other suitable material 3 forms a frictional means when the wheel 4 is brought into engagement with the brake-wheel 5. This will force the brake, as shown in Fig. 2, away from the wheel, but at the same time will force the rubber 3 against the inner face of the ring 6, as at 7, thereby retarding the movement of the wheel 4. I provide on each side of the brake-wheel 5 dust-proof washers 8, and in order to allow of the movement of the wheel that is required in braking make the opening 9 larger on two sides, as shown at 10. This will permit of the backward movement of brake-wheel without altering the relative position of the brake-beam. The washers also have inturned flanges 11, that fit into corresponding grooves 12, formed in the body of brake-wheel, as by this form dirt will not so easily work into the interior of the wheel. In order that the tire will grip the wheel-brake more readily, I flute the edges, as is illustrated at 13.

I do not care to limit myself to the exact details of construction, as various changes may be made without departing from the spirit of my invention.

What I claim, and desire to secure by Letters Patent, is—

In a vehicle-brake, a brake-beam having a square shaft formed thereon, a rubber body fitting into the annular recess of wheel, a ring surrounding the rubber body, washers with inturned flanges and having the central opening larger than the square shaft for the lateral movement of the wheel-brake, substantially as described.

In testimony whereof I affix my signature, in the presence of two witnesses, this 1st day of September, 1903.

JOHN G. EBKEN.

Witnesses:
J. P. APPLEMAN,
JOHN NOLAND.